United States Patent [19]
Zwier

[11] Patent Number: 5,301,461
[45] Date of Patent: Apr. 12, 1994

[54] EDGING STRIP

[75] Inventor: Daniel G. Zwier, Grand Rapids, Mich.

[73] Assignee: PermaLoc Corporation, Holland, Mich.

[21] Appl. No.: 985,303

[22] Filed: Dec. 4, 1992

[51] Int. Cl.$^5$ .............................................. A01G 1/00
[52] U.S. Cl. ........................................ 47/33; 52/102; 404/7
[58] Field of Search ........................ 47/33; 404/7, 8; 52/102

[56] References Cited

U.S. PATENT DOCUMENTS

| 1,666,613 | 4/1928 | Woods | 47/33 |
| 2,662,342 | 12/1953 | Peterson | 47/33 |

FOREIGN PATENT DOCUMENTS

| 3717877 | 12/1988 | Fed. Rep. of Germany | 47/33 |
| 215529 | 12/1923 | United Kingdom | 47/33 |

Primary Examiner—Ramon S. Britts
Assistant Examiner—Joanne C. Downs
Attorney, Agent, or Firm—Flynn, Thiel, Boutell & Tanis

[57] ABSTRACT

A landscape edging assembly which includes first and second elongated strips of material having longitudinal top and bottom edges and being adapted for use as landscape edging. The strips are adapted for end-to-end alignment along longitudinal axes thereof with mutually adjacent ends of each of the strips having an end segment that is laterally offset with respect to a remainder segment by an amount that is equal to or just slightly greater than a thickness dimension of the strips. The end segment and the remainder segment on each strip are integrally connected by a transversely extending segment and having an edge opening slot on the top edge of one of the strips and on the bottom edge of the next mutually adjacent strip. Each slot extends generally halfway into the strip from a respective edge, leaving a remainder transversely extending segment joining the end segment and the remainder segment on each of the strips. The remainder transversely extending segment on each strip is received in a respective slot with the end segment of the strips being oriented in a parallel side-by-side relation with the remainder segments. An anchoring structure is also provided for anchoring the end-to-end connected strips to a ground surface forming a part of a landscape setting. The remainder segments of the two strips become longitudinally aligned and interconnected by the remainder transversely extending segments being received in a respective slot.

18 Claims, 6 Drawing Sheets

EDGING STRIP

FIELD OF THE INVENTION

This invention relates to a landscape edging assembly and, more particularly, to a landscape edging assembly which consists of first and second elongated strips of material connected end-to-end and an anchoring structure for anchoring the first and second strips to a ground surface forming a part of a landscape setting.

BACKGROUND OF THE INVENTION

There exists a variety of landscape edging products in the marketplace, my earlier U.S. Pat. No. 4,628,632 being a representative example of a product that is widely known. Landscape edging products are made of aluminum strips and aluminum staking, as well as plastic strips and metal staking. It is a well-recognized problem with landscape edging products, particularly in colder climatic areas, where freezing and thawing cause the ground to heave in response to temperature variations between freezing and thawing. Such ground movements have the tendency to force landscape edging out of the ground over time. It is, of course, desirable not to have the landscape edging products gradually move upwardly out of the ground as the ground heaves. One way of solving this particular problem is to allow for relative movement between joined edging strips as taught in my aforesaid earlier patent. In the arrangement, however, the top of the stake is visible and creating the end-to-end connection is not always convenient.

It is the usual practice among landscape architects to first assemble the edge strips alongside of the trench into which the edging strip is to be placed. This procedure gives the landscape architect an opportunity to visualize the arrangement and place any required bends into the edging strip before the edging strip is laid into the trench. However, there exists a problem associated with known edging strip assemblies, and this is particularly true with my earlier issued U.S. Pat. No. 4,628,632 and is also true with respect to U.S. Pat. No. 5,020,272, namely, when the edging strips are connected end-to-end and oriented alongside the trench, an effort to move the connected edging strips into the trench will oftentimes result in the edging strips becoming disconnected. Accordingly, it is desirable to provide an interconnection feature between the edging strip sections which will not become disconnected as the edging strip is moved outside of the trench therefor.

Accordingly, it is an object of this invention to provide a landscape edging assembly which is capable of effecting a joining of a pair of elongated strips end-to-end and enabling such end-to-end connected sections to move slightly relative to each other to compensate for ground movements that may occur.

It is a further object of the invention to provide a landscape edging assembly, as aforesaid, which is easy to assemble with a minimum of instruction.

It is a further object of the invention to provide a landscape edging assembly, as aforesaid, which has structure on the edging strip which operatively cooperates with structure on a stake to facilitate an interlock between the stake and the edging strip as the stake is driven into the ground.

It is a further object of the invention to provide a landscape edging assembly, as aforesaid, wherein the relationship between the stake and the edging strip is such as to facilitate relative movement between joined ends of the elongated strip in response to heaving of the ground.

It is a further object of the invention to provide a landscape edging assembly, as aforesaid, which orients the ground engaging stake on a side of the edging strip remote from paver stones or the like so as to allow the edging strip to fit tightly against the paver stones.

It is a further object of the invention to provide a landscape edging assembly, as aforesaid, wherein the end-to-end adjoined edging strips are easily spliced together in a manner such as to eliminate stakes at the joint, thereby greatly reducing labor during installation.

It is a further object of the invention to provide a landscape edging assembly, as aforesaid, wherein the upper end of the ground engaging stake is oriented below the top edge of the edging strip to give the assembled landscape edging assembly a uniform appearance without any of the ground engaging stakes being visible.

It is a further object of the invention to provide a landscape edging assembly, as aforesaid, wherein each of the adjoined strips include longitudinally extending ribs and grooves which are forced into engagement with one another to provide an intersplined relationship thereby keeping the joined together ends in longitudinal alignment with one another.

It is a further object of the invention to provide a landscape edging assembly, as aforesaid, wherein several edging strip sections can be connected together alongside the trench into which the edging strips are to be placed, which connection is secure and will not become disconnected as the edging strips are moved from a position alongside the trench to a position within the trench.

It is a further object of the invention to provide a landscape edging assembly, as aforesaid, wherein the edging strip sections can be securely connected end-to-end without the necessity of additional fastening elements.

It is a further object of the invention to provide a landscape edging assembly, as aforesaid, wherein the edging strip sections can be connected together without the employment of additional fastening elements and while the edging strip sections are located in the trench provided therefor.

It is a further object of the invention to provide a landscape edging assembly, as aforesaid, which is of a heavy-duty construction to enable the finished product to withstand significantly high loads applied thereto during and following installation.

SUMMARY OF THE INVENTION

The objects and purposes of this invention have been met by providing a landscape edging assembly which includes first and second elongated strips of material having longitudinal top and bottom edges and being adapted for use as landscape edging. The strips are adapted for end-to-end alignment along longitudinal axes thereof with mutually adjacent ends of each of the strips having an end segment that is laterally offset with respect to a remainder segment by an amount that is equal to or just slightly greater than a thickness dimension of the strips. The end segment and the remainder segment on each strip are integrally connected by a transversely extending segment and having an edge opening slot on the top edge of one of the strips and on the bottom edge of the next mutually adjacent strip.

Each slot extends generally halfway into the strip from a respective edge, leaving a remainder transversely extending segment joining the end segment and the remainder segment on each of the strips. The remainder transversely extending segment on each strip is received in a respective slot with the end segment of the strips being oriented in a parallel side-by-side relation with the remainder segments. An anchoring structure is provided for anchoring the end-to-end connected strips to a ground surface forming a part of a landscape setting. The remainder segments of the two strips become longitudinally aligned and interconnected by the remainder transversely extending segments being received in a respective slot.

BRIEF DESCRIPTION OF THE DRAWINGS

Other objects and purposes of this invention will be apparent to those skilled in this particular art with reference to the following specification and to the accompanying drawings, in which.

DETAILED DESCRIPTION

Figure 1:
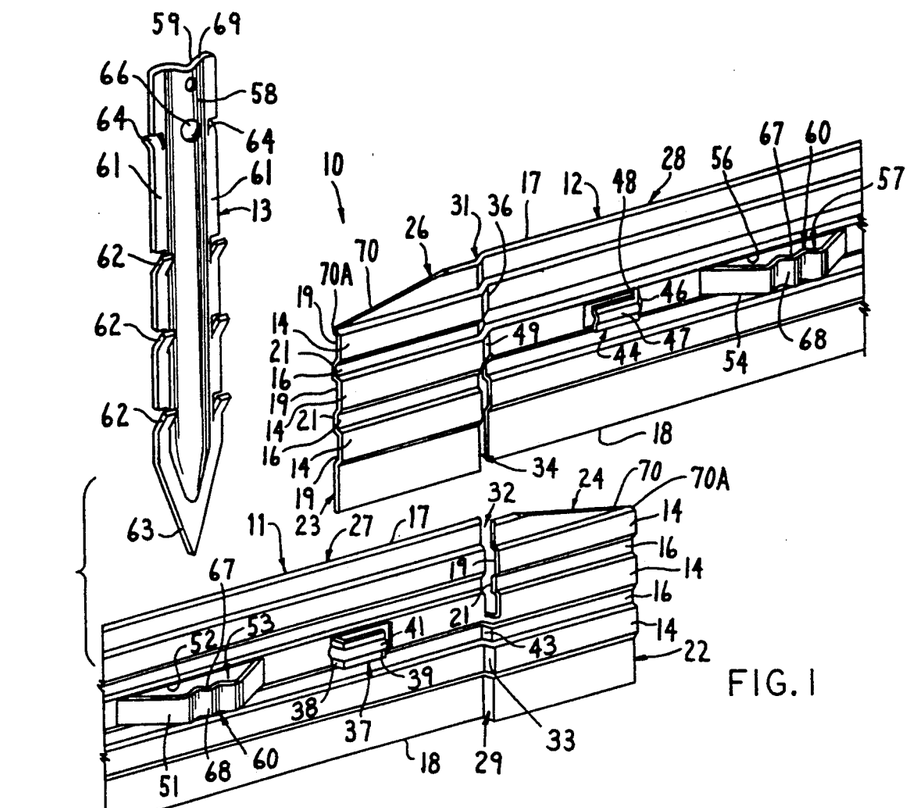
FIG. 1 is an exploded isometric view of a landscape edging assembly embodying my invention.

FIG. 1 illustrates a landscape edging assembly 10 which embodies my new invention. More specifically, the edging assembly 10 includes first and second elongated strips 11 and 12 and a plurality of stakes 13, one of which being illustrated in FIG. 1. The elongated strips of material are, in this particular embodiment, extruded aluminum strips and are generally die stamped to an identical configuration. That is, the not-illustrated left end of the elongated strip 11 illustrated in FIG. 1 is identical to the left end of the elongated strip 12. Similarly, the not-illustrated right end of the elongated strip 12 is identical to the right end of the elongated strip 11. Further, each strip 11 and 12 includes alternating ribs and grooves 14 and 16, respectively, extending lengthwise of the strips between the top edge 17 and the bottom edge 18. Of particular importance is the fact that the aforesaid ribs and grooves 14, 16 are provided on a first laterally facing side of each of the strips 11 and 12, whereas on the oppositely facing side of each strip there exists corresponding grooves 19 and ribs 21 which correspond in dimension so as to fit into the aforesaid ribs and grooves 14, 16 when the edging strips 11 and 12 are placed into a side-by-side and end-to-end relationship to each other.

Figure 3:
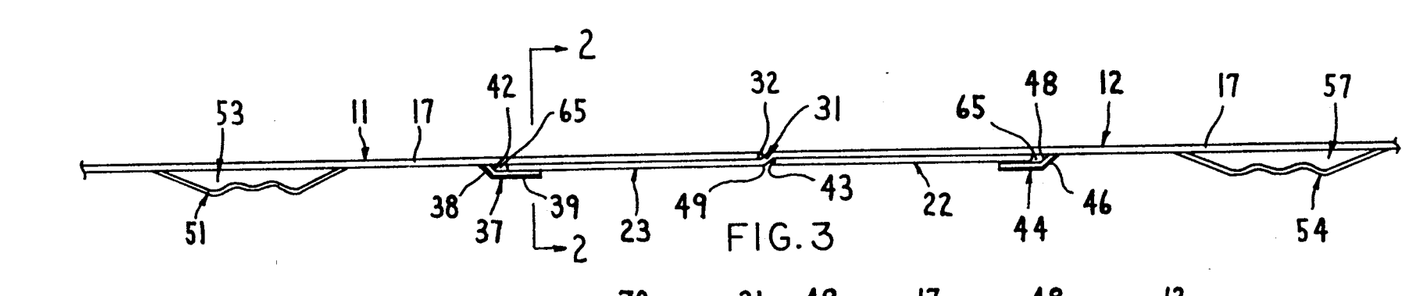
FIG. 3 is a top view or FIG. 2.

Mutually adjacent ends 22 and 23 of the strips 11 and 12, respectively, each have end segments 24 and 26, respectively, which are laterally offset with respect to a remainder segment 27 and 28, respectively, the end segments 24 and 26 each being integrally connected to the corresponding remainder segments 27 and 28 by a transversely extending segment 29 and 31. As is illustrated in FIG. 3, the amount of lateral offsetness of the end segments 24 and 26 with respect to the corresponding remainder segments 27 and 28 is generally just slightly greater than a thickness dimension of each of the respective strips 11 and 12. As a result, when the strips 11 and 12 are joined end-to-end as illustrated in FIG. 3, the outward appearance of the two strips appears to be as a unified and continuously extending single elongated strip, particularly when the stake 13 is not visible in association therewith for reasons which will be explained in more detail below.

The transversely extending segment 29 on the elongated strip 11 includes an edge opening slot 32 which extends into the top edge 17 of the transversely extending segment and extends generally halfway into the strip from the top edge, leaving a remainder transversely extending segment 33 which joins the end segment 24 to the remainder segment 27. Similarly, the transversely extending segment 31 on the elongated strip 12 has a slot 34 extending into the elongated strip 12 from the bottom edge 18 thereof and generally halfway into the strip, leaving a remainder transversely extending segment 36 joining the end segment 26 to the remainder segment 28.

A tab 37 is punched out of the material of the remainder segment 27 of the elongated strip 11, which tab has an L-shaped configuration, the leg 38 providing the interconnection between the remainder segment 27 and the other leg 39 which extends parallel to the remainder segment 27. A raised rib 41 is provided on both of the legs 38 and 39 of the L-shaped tab 37 in order to provide a degree of stiffness to an otherwise elastically yieldable tab 37. The leg 38 of the tab 37 extends outwardly from the remainder segment 27 and has a longitudinally facing surface 42 which opposes an oppositely facing surface 43 on the remainder transversely extending segment 33. Further, the leg 38 is spaced from the surface 43 of the remainder transversely extending segment 33 by a distance that is slightly greater than the longitudinal length of the end segment 26 on the elongated strip 12. In addition, the leg 39 is parallel to the remainder segment 27 and is spaced from the remainder segment 27 approximately the thickness of the edging strip as best illustrated in FIG. 3. Yet, and due to the elasticity of the material of the edging strip, the leg 39 can be flexed toward and away from the remainder segment 27 for reasons which will become apparent below.

A tab 44 identical to the tab 37 is provided on the remainder segment 28 of the elongated strip 12, except that the tab 44 opens in a longitudinal direction which opposes the opening defined by the tab 37. Further, a leg 46 of the tab 44 is spaced from the remainder transversely extending segment 36 by a distance that is generally equal to the longitudinal length of the end segment 24 on the elongated strip 11. The leg 47 of the tab 44 is elastically flexible about the leg portion 46 for reasons which will become apparent below. Similarly, the longitudinally facing surface 48 of the leg 46 of the tab 44 opposes the surface 49 of the remainder transversely extending segment 36.

An elongated ribbon strip 51 is punched out of the material of the elongated strip 11 with opposite longitudinal ends of the ribbon being integrally connected to the material of the elongated strip 11. The punched-out material of the ribbon strip 51 leaves a hole 52 in the remainder segment 27. In this particular embodiment, the location of the ribbon strip 51 is on a side of the tab 37 remote from the remainder transversely extending segment 33. Further, the elongated ribbon strip 51 is bent outwardly of the face of the remainder segment 27 on the same side as is the tab 37 so as to define a loop 53 adapted to receive therein the stake 13. A corresponding elongated ribbon strip 54 is punched out of the material of the elongated strip 12 as illustrated in FIG. 1. The elongated ribbon strip 54 causes a corresponding hole 56 to be formed in the remainder segment 28 as well as a loop 57 for receiving a stake 13 therein.

The stake 13 includes, in this particular embodiment, an elongated strip of metal having a central extending raised rib 58 on one side thereof and a corresponding recess 59 on the opposite side thereof, this being due to the stake 13 being made of a uniformly thick metallic, here aluminum, material. Flat lateral edges 61 exist on opposite lateral sides of the central rib and recess 58, 59. A plurality of barbs 62 are bent out from each of the flat lateral edges 61, which barbs extend outwardly from the flat lateral edges on the same side of the stake 13 as is the raised rib 58. The barbs 62 are oriented toward the bottom end 63 of the stake, which bottom end is formed into a point. A pair of barbs 64 are also bent out from each of the flat lateral edges 61 and on opposite sides of the central rib and recess 58, 59 but are oriented adjacent the upper end of the stake 13 as illustrated in FIG. 1. In this particular embodiment, the barbs 64 project outwardly from the flat lateral edges 61 on a side of the stake whereat the recess 59 is provided. A bead 66 is formed on the rib 58 intermediate the two barbs 64.

Figure 2:
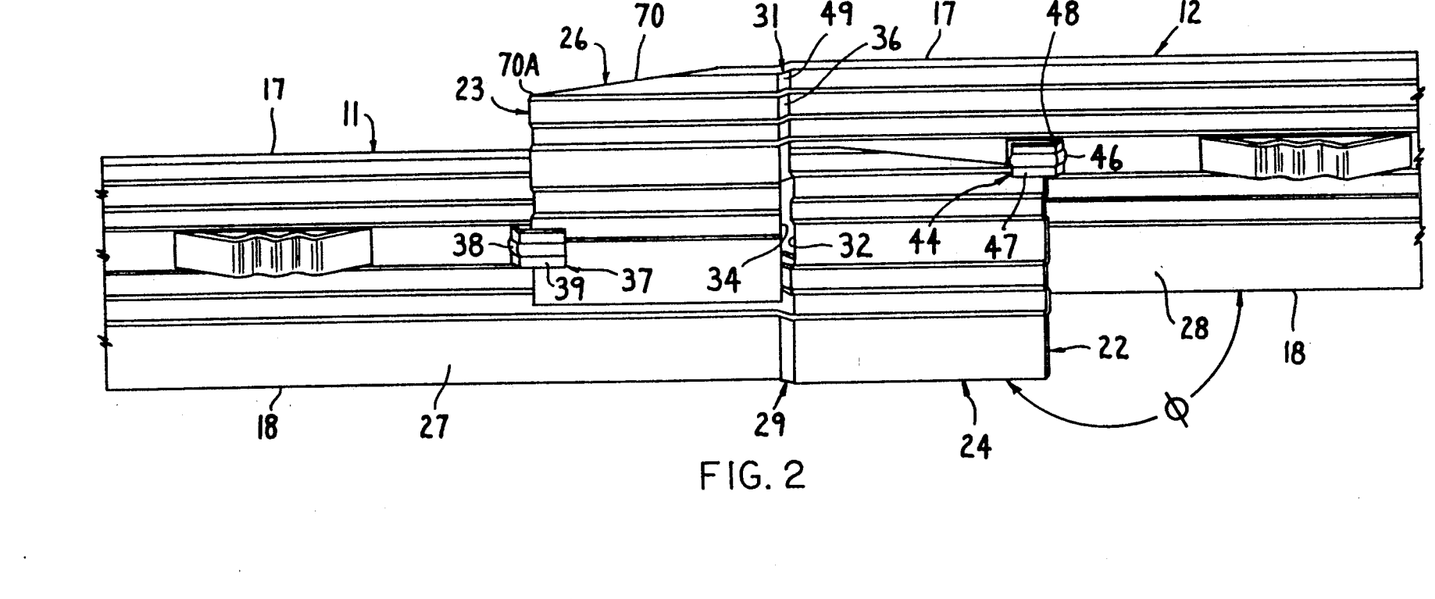
FIG. 2 is a partially assembled side view of a pair of edging strips embodying my invention.
Figure 2A:
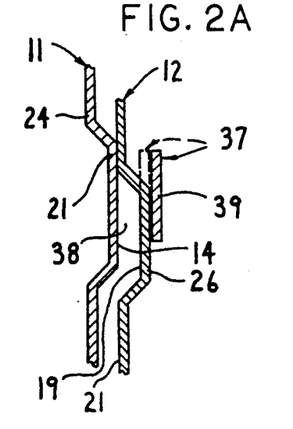
FIGS. 2A and 2B are each sectional views taken along the line 2—2 in FIG. 3.
Figure 2B:
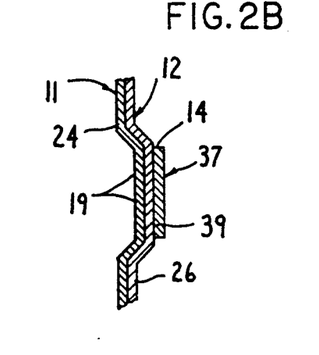
Figure 4:
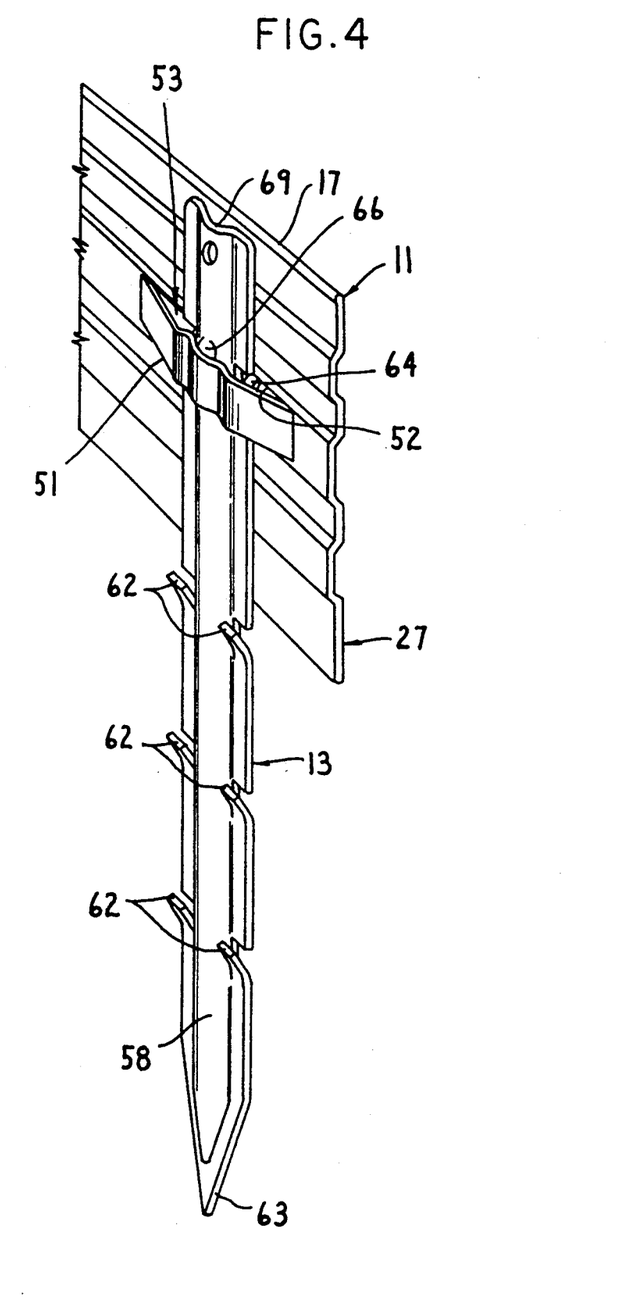
FIG. 4 is an isometric view of an edging strip and a ground engaging stake operatively connected therewith.
Figure 5:
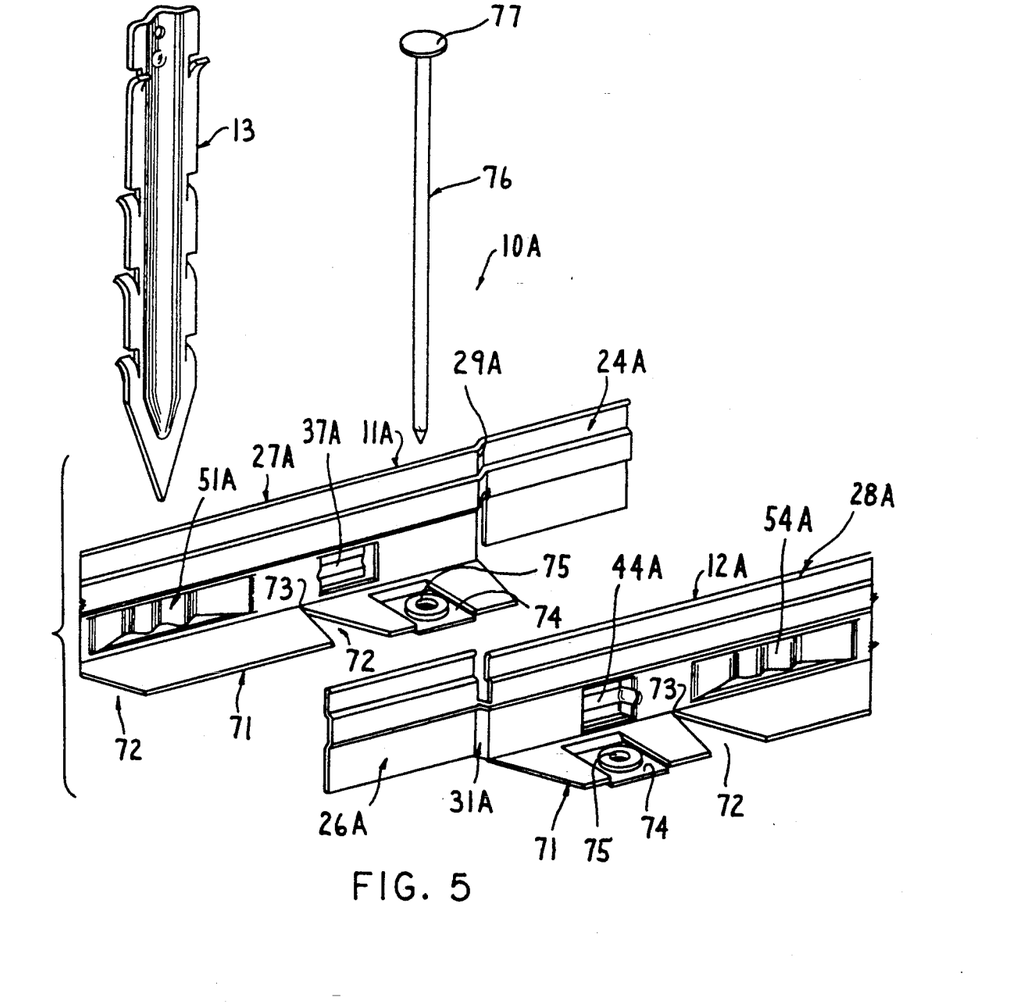
FIG. 5 is an exploded perspective view of a further embodiment of a landscape edging assembly embodying my invention.
Figure 6:
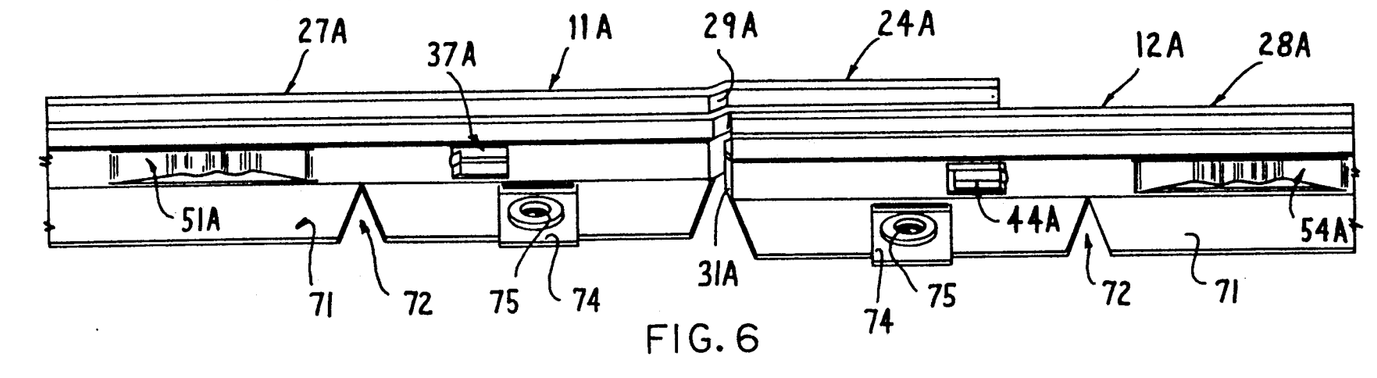
FIG. 6 is a partially assembled side view of the modified embodiment illustrated in FIG. 5.
Figure 7:
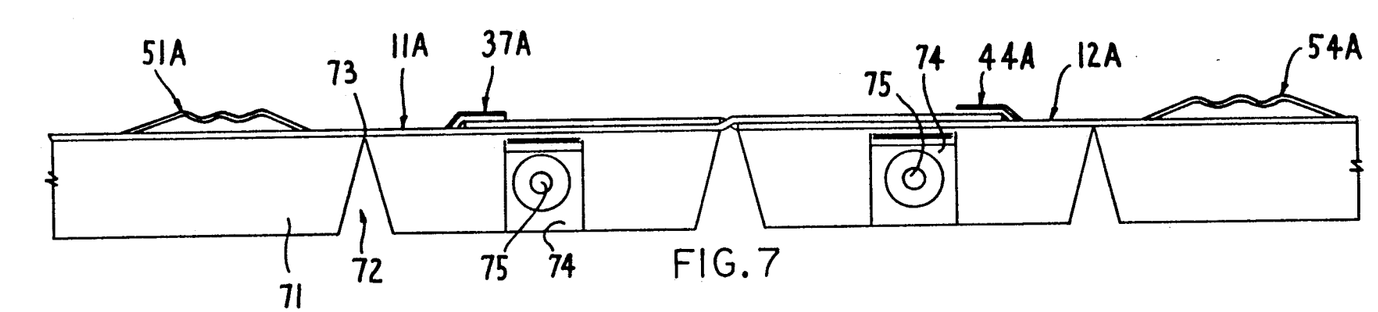
FIG. 7 is a top view of FIG. 6.
Figure 8:
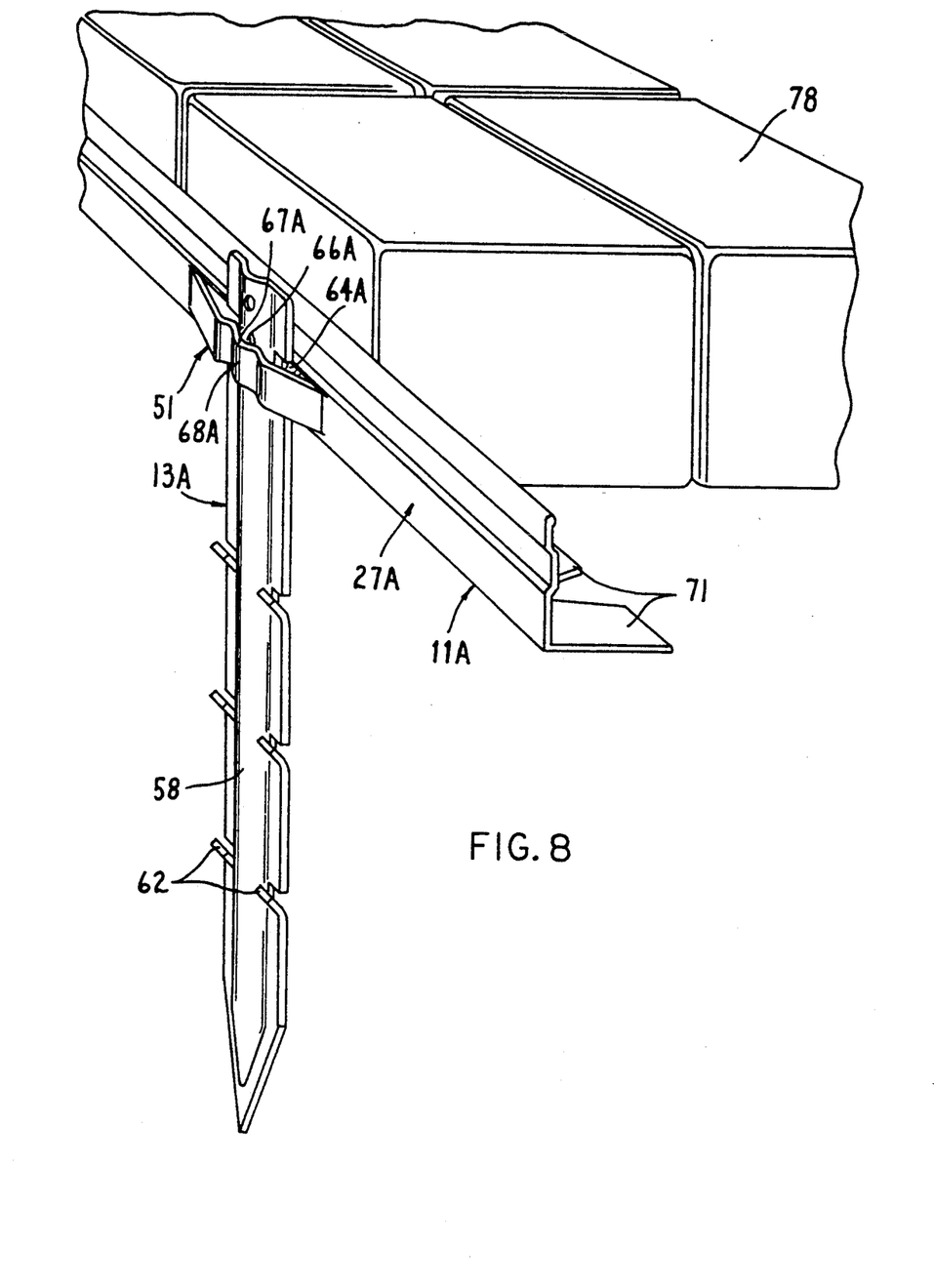
FIG. 8 is a isometric view of the modified edging strip and interconnected stake utilized in association with brick and/or paving stones.

When it is desired to assemble an elongated strip 11 end-to-end with an elongated strip 12, the strips 11 and 12 are first oriented alongside a trench dug for the elongated strip sections and so that they are generally end-to-end with the end segment 24 being aligned generally parallel to the remainder segment 28 and the end segment 26 generally parallel to the remainder segment 27. As illustrated in FIG. 1, the elongated strip 12 is oriented above the elongated strip 11 with the remainder transversely extending segments 33 and 36 being vertically aligned as are the upwardly opening slot 32 and the downwardly opening slot 34. The remainder transversely extending segment 33 is received into the slot 34 whereas the remainder transversely extending segment 36 is simultaneously received into the slot 32. Similarly, the end 22 of the end segment 24 is received into the open end of the L-shaped tab 44 at about the same time that the end 23 of the end segment 26 is received into the opening defined by the tab 37 as illustrated in FIG. 2. As depicted in FIG. 2A, the tab 37, particularly the leg 39 thereof, is flexed outwardly to the solid-line position as the opposed ribs 14 and 21 move past each other. When the elongated strip 11 becomes oriented precisely in an aligned end-to-end relation with the elongated strip 12, the ribs 14 will be received in corresponding recesses 19 as depicted in FIG. 2B and the leg 39 of the tab 37 will effectively hold the ribs 14 into the corresponding grooves 19. Thereafter, the end-to-end securement is secure and the assembly can be picked up and moved into the trench while simultaneously bending the strip to accommodate curves and the like. Once the assembly has been acceptably placed into the trench, a stake 13 can be driven through the loops 53 and 57. As the bead 66 engages an upper edge 67 of a central region 68 of the elongated ribbon strips 51 and 54, the bead 66 will cause an outward flexing of the central region 68 away from the face of the remainder segments 27, 28 so that as the barbs 64 move past the downwardly facing edge of the openings 52 and 56, the elasticity of the elongated ribbon strips 51 and 54 will urge the barbs 64 into the holes 52 and 56 as best illustrated in FIG. 4 so as to interlock the remainder segments 27 and 28 to the stakes 13. The upper end 69 of each stake is preferably oriented below a horizontal plane containing the upper edge 17 so that the stake will not be visible when oriented beneath the ground level. The barbs 62 will prevent an upward withdrawal of the stake 13 once it has been driven into the ground, it being noted that the flare of the barbs 62 allows entry of the stake 13 into the ground but resists upward movement relative to the ground after the stake has been inserted into the ground. The longitudinally extending ribs and grooves 14, 16, 19 and 21 on the strips 11 and 12 prevent relative movement of the strips 11, 12 with respect to the ground.

The ribbon strips 51 and 54 are somewhat corrugated as at 60 so that when mutually adjacent ends of the edging strip 11 and 12 are connected end-to-end, the end-to-end assembly may be appropriately bent about an axis that is perpendicular to the longitudinal axis of the assembly to accommodate curves in any landscape setting without effecting the dimension of the openings of the loops 53 and 57. In other words, the bead 66 adjacent the upper ends of the stakes will be able to operatively cooperate with the upper edge 67 of the central region 68 even after the strip has been bent at locations which include the joint between mutually adjacent ends of the strips. That is, the corrugated construction 60 will keep the central region 68 spaced from and opposing a side surface of each strip 11 and 12 to enable the bead 66 on the stake to frictionally engage the central region 68 on the ribbon strips 51 and 54.

The top edge 17 of the end segments 24 and 26 are cut at a slant as at 70 so that at the juncture of the slant 70 and a corresponding end 22 and 23 of the strips 11 and 12, respectively, the corners 70A will each be disposed below a top edge 17 of an adjacent strip 11 and 12. Further, and as allowed by a spacing 65 (FIG. 3) between the respective ends 22 and 23 and the surfaces 42 and 48 on the tabs 37 and 44, respectively, the strips 11 and 12 are able to form an angle $\phi$ which is greater or less than 180° to compensate for terrain changes and variations in ground level caused by ground temperature variations between freezing and thawing.

FIGS. 5–8 illustrate a modified embodiment of a landscape edging assembly 10A. The reference numerals used above to describe the first embodiment are repeated below but with the suffix "A" added in those instances where the reference numeral describes components having similar characteristics. The major difference between the embodiment described above and the embodiment illustrated in FIGS. 5–8 is that each remainder segment 27A and 28A has a planar section 71 extending at a right angle relative to and from the lower edge of each thereof. The planar sections 71 each include a plurality of V-shaped notches 72 therein, which notches are spaced along the length of the planar section 71 and the corresponding length of the remainder segments 27A and 28A. In this particular embodiment, the vertex 73 of each V is oriented at a juncture between the planar section 71 and the remainder segment 27A and 28A so as to facilitate a bending of the remainder segments 27A and 28A about an axis extending perpendicular to the longitudinal axis of each strip and through the aforesaid vertices 73. It will be noted from FIG. 5 that the tabs 37A and 44A, as well as the elongated ribbon strips 51A and 54A, project outwardly from a face of the respective remainder segment 27A and 28A which is opposite to the planar sections 71. The planar sections 71 adjacent the remainder transversely extending segments 33 and 36 each have a punched out lance 74 with a reinforced edging or rim around a hole 75 extending therethrough for purposes of receiving an elongated ground engaging nail 76 having an enlarged head 77 at the upper end thereof. In this embodiment, the end segments 24A and 26A do not have a planar section associated therewith.

The elongated strips 11A and 12A are adapted for use in association with paver stones 78 (FIG. 8), namely, brick-like stones, which rest on the upwardly facing surface of the planar sections 71. It is to be noted that the stones will be placed into position after the nails 76 are driven through the respective holes 74 into a ground engaging relation. Thereafter, the paver stones can be placed on top of the planar sections 71. It should also be noted that the stakes 13 are oriented on a side of the respective remainder segments 27A and 28A, which are remote from the paver stones. As a result, a rigid and sturdy construction is provided which will remain in place for a long time.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A landscape edging assembly, comprising:
    first and second elongated strips of material having longitudinal top and bottom edges and being adapted for use as landscape edging, said strips being adapted for end-to-end alignment along longitudinal axes thereof, mutually adjacent ends of each of said strips having an end segment that is laterally offset with respect to a remainder segment by an amount equal to or just slightly greater than a thickness dimension of said strips, said end segment and said remainder segment on each strip being integrally connected by a transversely extending segment and having means defining an edge opening slot, said edge opening slot on said first strip being provided in said top edge of said transversely extending segment, said edge opening slot on said second strip being provided in said bottom edge of said transversely extending segment, each slot extending generally halfway into said strip from a respective edge leaving a remainder transversely extending segment joining said end segment and said remainder segment on each said first and second strips, said remainder transversely extending segment on each said first and second strips being received in a said slot with said end segments of said first and second strips being oriented in a parallel relation with said remainder segments, whereby said remainder segments of said first and second strips become longitudinally aligned and interconnected by said remainder transversely extending segments being received in a respective slot.

2. The landscape edging assembly according to claim 1, wherein said first and second strips each have a holding means for engaging and holding said end segments in said parallel relation with said remainder segments.

3. The landscape edging assembly according to claim 2, wherein said holding means is spaced in a longitudinal direction from an end of said first and second strips on a side of said transversely extending segment remote from said end segment a distance generally equal to or slightly greater than a length dimension of said end segment.

4. The landscape edging assembly according to claim 3, wherein said holding means on each of said first and second strips is a generally elongated L-shaped tab integrally attached to each said strip at a free end of only one leg of said L-shaped tab, another leg of said L-shaped tab extending generally parallel to said remainder segment of said strip and extending coextensively along side of and parallel to said remainder segment, said other leg on said first strip engaging said end segment on said second strip on a side of said end segment remote from said remainder segment of said first strip to hold said end segment of said second strip in said parallel relation with said remainder segment of said first strip.

5. The landscape edging assembly according to claim 2, wherein sufficient clearance exists between said holding means and a longitudinally facing end of each said strip at said mutually adjacent ends thereof in order to facilitate said first and second strips being oriented at an obtuse angle with respect to one another to compensate for variations in terrain elevation in the landscape setting.

6. The landscape edging assembly according to claim 1, wherein said offset related remainder segment and said end segment of each strip lie in parallel planes.

7. The landscape edging assembly according to claim 1, including an anchoring means for anchoring the end-to-end connected first and second strips to a ground surface forming a part of a landscape setting.

8. The landscape edging assembly according to claim 7, wherein said anchoring means includes an elongated ribbon strip punched out of and being integrally attached at opposite longitudinal ends to said remainder segments, said ribbon strip being bent out of a plane containing said remainder segment to form a stake receiving loop and leaving a hole through said remainder segment opposing said ribbon strip, wherein an elongated stake is provided having a generally ground piercing end at a lower end, said stake extending through said loop, said stake having means defining a first protrusion adjacent an upper end, said first protrusion engaging an upwardly facing edge of said ribbon strip as said stake is driven into the ground surface, said stake also including means defining a second protrusion adjacent said first protrusion but protruding from said stake in a direction opposite said first protrusion so that as said stake is further driven into the ground, said first protrusion will move downwardly past said upwardly facing edge of said ribbon strip causing said ribbon strip to flex outwardly away from said remainder segment and an increase in a frictional contact between said first protrusion and said ribbon strip while simultaneously forcing said second protrusion to enter said hole so that an engagement of said second protrusion with an upper edge of said hole will effectively lock said remainder segment to said stake and thence to the ground surface.

9. The landscape edging assembly according to claim 8, wherein at least one of said first and second strips includes a planar section extending from the bottom edge of and at a right angle to a plane containing said remainder segment so that said remainder segment has, in a vertical cross section thereof, an L-shape.

10. The landscape edging assembly according to claim 9, wherein said planar section extends from a side of said remainder segment that is opposite said ribbon strip.

11. The landscape edging assembly according to claim 10, wherein said anchoring means also includes means defining a hole through said planar section, and a ground engaging stake received in said hole and having an enlarged head whose cross sectional area is larger than that of said hole.

12. The landscape edging assembly according to claim 1, wherein at least one of said first and second strips includes a planar section extending from the bottom edge of and at a right angle to a plane containing said remainder segment so that said remainder segment has, in a vertical cross section thereof, an L-shape.

13. The landscape edging assembly according to claim 12, including an anchoring means for anchoring the end-to-end connected first and second strips to a ground surface forming a part of a landscape setting, and wherein said anchoring means includes means defining a hole through said planar section, and a ground engaging stake received in said hole and having an enlarged head whose cross sectional area is larger than that of said hole.

14. The landscape edging assembly according to claim 12, wherein said planar section includes plural V-shaped notches spaced along a length thereof, a vertex of each V being oriented adjacent the plane containing said remainder segment to thereby facilitate a bending of said strip about an axis extending perpendicular to the longitudinal axis thereof on through said vertex.

15. The landscape edging assembly according to claim 1, wherein said first and second strips each have a holding means for engaging and holding said end segments in said parallel relation with said remainder segments, and wherein laterally facing side surfaces of each elongated strip have longitudinally extending and mating ribs and grooves, said ribs being received in corresponding grooves on opposite ones of the elongated strips and held in engagement by said holding means.

16. The landscape edging assembly according to claim 15, wherein said holding means on each of said first and second strips is generally an elongated L-shaped tab integrally attached to each said strip at one end of one leg of said L-shaped tab, another leg of said L-shaped tab extending generally parallel to said remainder segment of each of said strips and extending coextensively along side of and parallel to said remainder segments, said other leg on said first strip engaging said end segment on said second strip on a side of said end segment remote from said remainder segment of said first strip to hold said end segment of said second strip in said parallel relation with said remainder segment of said first strip, and wherein said L-shaped tab is elastically flexible to allow said ribs and grooves to move past one another as said elongated strips are moved toward said end-to-end relationship.

17. The landscape edging assembly according to claim 1, including an anchoring means for anchoring the end-to-end connected first and second strips to a ground surface forming a part of a landscape setting, and wherein said anchoring means includes an elongated ribbon strip punched out of and being integrally attached at opposite longitudinal ends to said remainder segments, said ribbon strip being bent out of a plane containing said remainder segment to form a stake receiving loop and leaving a hole through said remainder segment opposing said ribbon strip, wherein an elongated stake is provided having a generally ground piercing end at a lower end, said stake extending through said loop, said stake having means defining a first protrusion adjacent an upper end, said first protrusion engaging an upwardly facing edge of said ribbon strip as said stake is driven into the ground surface, said stake also including means defining a second protrusion adjacent said first protrusion but protruding from said stake in a direction opposite said first protrusion so that as said stake is further driven into the ground, said first protrusion will move downwardly past said upwardly facing edge of said ribbon strip causing said ribbon strip to flex outwardly away from said remainder segment and an increase in a frictional contact between said first protrusion and said ribbon strip while simultaneously forcing said second protrusion to enter said hole so that an engagement of said second protrusion with an upper edge of said hole will effectively lock said remainder segment to said stake and thence to the ground surface, and wherein an upper end of said stake is oriented below a horizontally extending plane containing said upper edge of said elongated strips.

18. The landscape edging assembly according to claim 1, wherein said upper edge of each of said end segments is angled so that an upper edge of said end segments will be oriented below a horizontal plane containing said upper edge of said elongated strips.

* * * * *